United States Patent [19]

Ishige et al.

[11] Patent Number: 4,489,119

[45] Date of Patent: Dec. 18, 1984

[54] LAMINATED STRUCTURE

[75] Inventors: Yoshiki Ishige, Tokorozawa; Toshiyuki Kinugasa, Hidaka; Shoji Sato, Tokorozawa, all of Japan

[73] Assignee: Honda Giken Kogyo Kabushiki Kaisha, Tokyo, Japan

[21] Appl. No.: 522,245

[22] Filed: Aug. 11, 1983

Related U.S. Application Data

[63] Continuation of Ser. No. 300,461, Sep. 8, 1981, abandoned.

[30] Foreign Application Priority Data

Jul. 19, 1979 [JP] Japan .................................. 54/90981

[51] Int. Cl.³ .................... B32B 3/28; B32B 31/00
[52] U.S. Cl. .................................. 428/167; 428/138; 156/87; 264/102
[58] Field of Search ............... 428/138, 167; 156/87; 264/102

[56] References Cited

U.S. PATENT DOCUMENTS

| 2,638,430 | 5/1953 | Mann | 156/295 |
| 3,016,317 | 1/1962 | Brunner | 156/87 |
| 3,126,478 | 3/1964 | Bergstrom | 428/138 |
| 3,160,970 | 12/1964 | Worrell | 156/87 |
| 3,551,232 | 12/1970 | Thompson | 156/87 |
| 3,551,270 | 12/1970 | Sharkey | 156/87 |
| 4,097,633 | 6/1978 | Focht | 428/138 |
| 4,128,683 | 12/1978 | Nomura et al. | 428/138 |
| 4,129,672 | 12/1978 | Nomura et al. | 428/138 |
| 4,211,590 | 7/1980 | Stenad et al. | 156/79 |

FOREIGN PATENT DOCUMENTS

| 2647514 | 4/1978 | Fed. Rep. of Germany | 156/87 |
| 55-508748 | 4/1980 | Japan | 156/87 |

Primary Examiner—John E. Kittle
Assistant Examiner—James J. Seidleck
Attorney, Agent, or Firm—Armstrong, Nikaido, Marmelstein & Kubovcik

[57] ABSTRACT

A contoured laminated structure is disclosed, in which a perforated substrate of the structure is formed with random interconnecting fine line grooves to facilitate the exhaustion of air from the interface of the substrate and superposed sheet material during the bonding of the sheet material to the substrate under vacuum pressure.

4 Claims, 4 Drawing Figures

LAMINATED STRUCTURE

This application is a continuation of application Ser. No. 300,461, filed Sept. 8, 1981 abandoned.

FIELD OF THE INVENTION

This invention relates to a contoured laminated structure, and while not limited thereto, particularly relates to a laminated structure comprising an instrument panel or the like for an automobile, or an interior trim member thereof.

BACKGROUND OF THE INVENTION

Contoured laminated structures, such as instrument panels for automobiles, are well known in the art in which an outwardly presented face of a substantially rigid substrate has laminated thereto a composite sheet having a facing of polyvinyl chloride or other suitable plastics material simulating leather and a backing or core of a foamed plastics material such as foamed polypropylene. Typically, the substrate is a molding formed from an ABS resin or a similar substantially rigid plastics material.

In order to facilitate the lamination of the composite sheet onto the complexly contoured outwardly presented face of the substrate, the substrate is provided with a large number of small perforations in the order of 0.2 to 2.5 mm, and the lamination is effected under the influence of vacuum applied to the rear face of the substrate, in order to draw the composite sheet into intimate face contact with the outwardly presented face of the substrate, and, in order to exhaust air from the interface of the substrate and the composite sheet.

While this technique is successful to an extent, it is encumbered with a major disadvantage that plugging or obstruction of the holes in the substrate can occur, with a consequence that pockets of air remain trapped at the interface of the substrate and the composite sheet, the trapped air interfering with or negating the uninterrupted bonding of the composite sheet to the substrate over the entire area of the interface. The plugging or obstruction of the holes in the substrate occurs as a result of the holes becomming plugged by the adhesive used in the bonding operation, or, by the holes becoming obstructed by the backing of the composite sheet as it is drawn onto the outer face of the substrate under vacuum pressure.

The presence of the trapped pockets of air at the interface poses a particular problem in those instances where the laminated structure is exposed to elevated temperatures, such as can occur within an automobile exposed to direct sunlight, where surface temperatures of the laminated structure may rise to 100° to 110° C.

At such elevated temperatures, the presence of even minute pockets of trapped air at the interface poses a problem, in that expansion of the entrapped air will cause separation of the composite sheet from the substrate in the form of blisters, and an attendant breakdown of the adhesive bond between the composite sheet and the substrate. This problem also can occur during the manufacture of the laminated structure in those instances where the formed structure is subjected to heat in order to speed curing of the bonding adhesive.

As will readily be apparent, the presence of such blisters or imperfections may adversely affect the marketability of the automobile.

SUMMARY OF THE INVENTION

The present invention overcomes this problem by forming the outwardly presented face of the substrate, or at least selected areas thereof, with a multitude of intersecting fine line grooves which connect with the perforations and which provide channels facilitating the complete exhaustion of air pockets at the interface of the substrate and the composite sheet during the bonding of the composite sheet to the substrate under vacuum pressure.

DESCRIPTION OF THE DRAWINGS

The invention will now be described with reference to the accompanying drawings, in which.

DETAILED DESCRIPTION OF THE INVENTION

Figure 1:
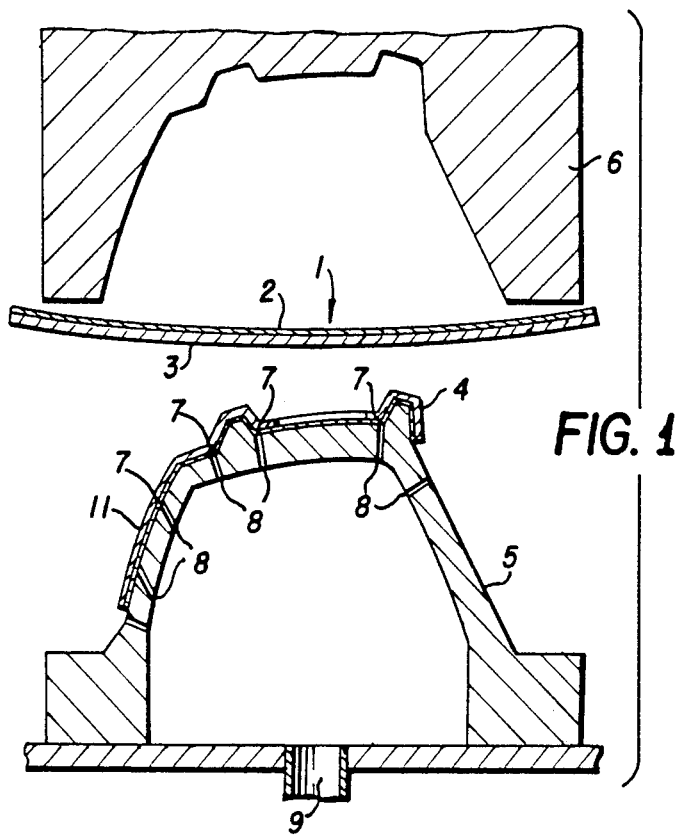
FIG. 1 is a sectional side view of a die set employed in the manufacture of the laminated structure of the invention, showing a substrate positioned on a male die of the set, and showing a composite sheet positioned beneath a female die of the set, preparatory to a laminating operation.

Referring now more particularly to FIG. 1 of the drawings, there is shown a composite sheet 1, comprised by a facing sheet 2 simulating leather, and a backing sheet 3 of foamed material having a thickness considerably in excess of the thickness of the facing sheet. Typically, the facing sheet is about 0.5 mm in thickness and is made of polyvinyl chloride or the like, and the foamed backing sheet is about 4 mm is thickness and is made of polypropylene foam or the like, the respective sheets being adhered to each other by a suitable bonding agent.

The composite sheet 1 is shown in a position in which it is ready for bonding onto the surface of a substrate 4, which typically is a molding of an ABS resin or the like. The substrate is formed during the molding thereof with a large number of small holes 7 for a purpose later described.

The adhesion of the composite sheet to the substrate 4 is effected in an entirely conventional manner. In particular, either the substrate 4 or the backing 3 of the composite sheet is coated with a suitable adhesive or bonding agent. The composite sheet 1 is positioned beneath the female die 6, and the die set is then closed. Upon closing of the die set or shortly before full closing thereof, vacuum pressure is admitted to the hollow interior of the male die 5 through a conduit 9, and is transmitted to the outwardly presented face of the substrate 4 via perforations 8 in the wall of the male die 5, and the perforations 7 in the substrate.

The various structures so far described are to be considered as being conventional in the art, and, are encumbered with the problems described above with respect to the bonding of the composite sheet 1 to the substrate 4. In particular, upon closing of the dies of the die set, the foamed backing 3 of the composite sheet 1 is pressed into face engagement with the substrate 4, with a consequence that the foamed backing 3 is pressed into the holes 7 in the substrate and tends to plug the holes, the vacuum pressure exerted through the holes 7 acting further to pull the backing material into the holes and further plug the holes. Additionally, the adhesive material or bonding agent present on the surface of the backing sheet 3 or the outer surface of the substrate 4 can be drawn into the holes and obstruct them. As is discussed above, the plugging or obstruction of the holes can result in incomplete exhaustion of air trapped at the interface of the backing sheet 3 and the outer face of the substrate 4, and, such trapped air pockets can occur even in the event that the holes 7 do not become plugged or obstructed, the tendency being for the backing sheet 3 to be drawn into face engagement with the substrate 4 initially in generally circular areas surrounding the holes 7, the contact of the face of the backing sheet 3 with the substrates 4 in those areas impeding or hampering the withdrawal of air from the interface at positions intermediate adjacent pairs of holes 7.

Figure 2:
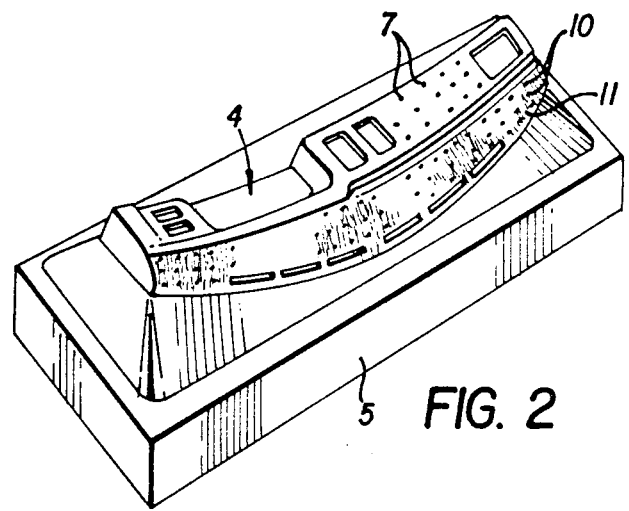
FIG. 2 is a perspective view of the male die of the die set of FIG. 1 showing the substrate positioned thereon.
Figure 3:
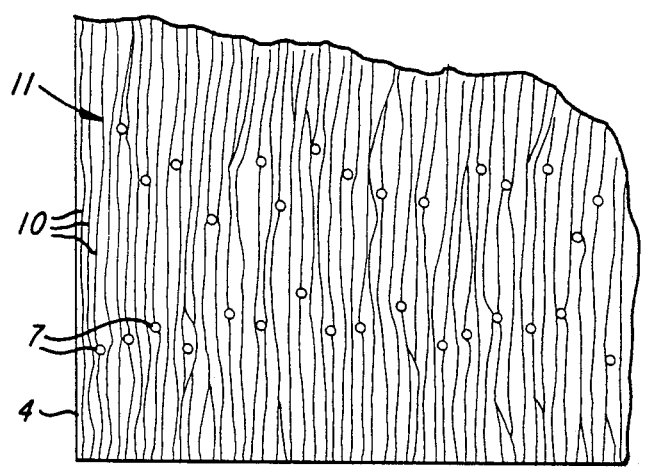
FIG. 3 is a front view of a portion of the substrate.
Figure 4:
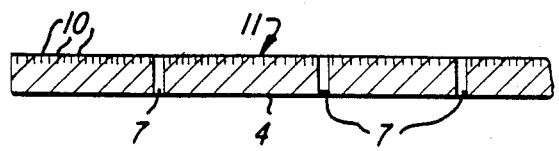
FIG. 4 is a sectional view through FIG. 3.

In order to eliminate or mitigate the disadvantages discussed above, according to the present invention, at least selected areas of the outwardly present surface of the substrate 4 are formed during the molding of the substrate with a multitude of fine line grooves or wrinkles 11, as is illustrated in FIG. 2. The fine line grooves 11 are located in surrounding relationship with the holes 7 located in the said selected areas, the fine line grooves, as more clearly illustrated in FIGS. 3 and 4 being intersecting and random in pattern such that they provide a multitude of minute channels providing for the exhaustion of air from the interface between the substrate 4 and the mutually presented face of the backing sheet 3.

While in FIG. 2 the fine line grooves 11 have been shown as restricted to determined areas, it will of course be understood that the entire outer face of the substrate 4 can be provided with such grooves.

The grooves 11 preferably are formed such that the individual grooves 10 are spaced from each other at intervals of about 3 mm, and, the individual grooves 10 cross one another at an interval of about 30 mm in the longitudinal direction of the grooves. Each groove 10 is between 0.02 to 0.2 mm and preferably 0.06 mm in width, and between 0.05 to 0.1 mm in depth.

The pattern of grooves 11 is not limited to the one illustrated, which is not critical to the basic inventive concept. For example, the pattern may be changed for the grooves to extend radially in all directions from the periphery of the holes 7 or multiple patterns of grooves may be arranged in intersecting grid form arrangement.

The patterns of grooves may be formed in the substrate 4 in any convenient manner, such as by etching the inner surface of the metallic mold used in the molding of the substrate 4 using a pattern master plate, so that the pattern thereof is transferred to or imprinted on the substrate 4 at the time of molding thereof.

During the lamination of the composite sheet 1 onto the outwardly presented surface of the substrate 4, the portions of the substrate intermediate the respective fine line grooves 10 provide a physical support for the juxtaposted face of the backing sheet 3, the grooves 10, at least initially, remaining unobstructed and providing for the channelling of air trapped at the interface to the holes 7, the evacuation of the entrapped air being effected under the influence of vacuum pressure, as previously discussed.

Experiments performed on laminated structures according to the present invention showed that upon five consecutive heatings of the laminate to a surface temperature of about 100° to 110° C. for ten hours and then cooling to room temperature, no blistering or other surface imperfections occured which could be attributed to the expansion of air trapped at the interface of the composite sheet and the substrate.

Additionally, when the laminate was cut into pieces to obtain test pieces, and the test pieces were subjected to tensile stresses in a direction to remove the composite sheet from the substrate, no peeling off of the composite sheet was observed, thus confirming that a uniform bond between the composite sheet and the substrate had been accomplished, this evidencing the absence of pockets of entrapped air at the interface of the composite sheet and the substrate.

What we claim is:

1. In a complexly contoured laminated structure comprising a substantially rigid substrate having a plurality of holes therethrough and a covering of sheet material bonded to a face of the substrate, said sheet material having a thickness, the improvement comprising:
    intersecting fine line grooves each having a width and
        a depth, said fine line grooves being
        (a) formed in selected areas of the substrate,
        (b) connected with said plurality of holes in said substrate,
        (c) spaced apart from each other, and
        (d) arranged in a random pattern and intersecting each other at regular intervals, the width of the fine line grooves being substantially less than the thickness of the sheet material.

2. In a contoured laminated structure according to claim 1, the further improvement comprising:
    each of said fine line grooves being of between 0.02 to 0.2 mm in width and between 0.05 to 0.1 mm in depth.

3. In a contoured laminated structure according to claim 1, the further improvement comprising:
    said grooves being spaced from each other at intervals of about 3 mm and intersecting each other at intervals of about 30 mm in a direction longitudinally of the respective grooves.

4. An instrument panel for a vehicle, comprising a substantially rigid substrate having a large number of holes therethrough for discharging air and a composite sheet consisting of a facing sheet simulating leather and an expanded plastics backing sheet adhered thereto, the composite sheet being adhered to the substrate with the facing sheet facing outwardly characterized in that an upper surface of the substrate corresponding to a sight surface of the instrument panel is provided with a pattern of wrinkles, having a large number of fine groove lines, and that the groove lines are connected with the holes.

* * * * *